United States Patent
Kim et al.

(10) Patent No.: US 8,831,620 B2
(45) Date of Patent: Sep. 9, 2014

(54) COMMUNICATION TECHNIQUE USING CHANGE OF TYPE OF FEMTO BASE STATION

(75) Inventors: Yong Ho Kim, Anyang-si (KR); Jin Lee, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 366 days.

(21) Appl. No.: 13/201,211

(22) PCT Filed: Feb. 12, 2010

(86) PCT No.: PCT/KR2010/000904
§ 371 (c)(1),
(2), (4) Date: Oct. 20, 2011

(87) PCT Pub. No.: WO2010/093198
PCT Pub. Date: Aug. 19, 2010

(65) Prior Publication Data
US 2012/0028645 A1  Feb. 2, 2012

Related U.S. Application Data

(60) Provisional application No. 61/292,833, filed on Jan. 6, 2010, provisional application No. 61/180,883, filed on May 24, 2009, provisional application No. 61/151,851, filed on Feb. 12, 2009.

(30) Foreign Application Priority Data

Feb. 12, 2010  (KR) .......................... 10-2010-0013171

(51) Int. Cl.
*H04W 36/00* (2009.01)
*H04W 48/06* (2009.01)
*H04W 84/04* (2009.01)
*H04W 24/00* (2009.01)
*H04W 36/04* (2009.01)
*H04W 16/14* (2009.01)
*H04W 36/30* (2009.01)

(52) U.S. Cl.
CPC ............ *H04W 48/06* (2013.01); *H04W 84/045* (2013.01); *H04W 24/00* (2013.01); *H04W 36/04* (2013.01); *H04W 16/14* (2013.01); *H04W 36/30* (2013.01)
USPC .......... 455/444; 455/452.2; 455/448; 370/332

(58) Field of Classification Search
CPC ..... H04W 48/06; H04W 36/04; H04W 36/30; H04W 24/00; H04W 16/14; H04W 84/45
USPC ........................ 455/444, 452.2, 448; 370/332
See application file for complete search history.

(56) References Cited

U.S. PATENT DOCUMENTS 8,072,953 B2 * 12/2011 Mukherjee et al. ........... 370/338
2007/0183427 A1   8/2007 Nylander et al.
(Continued)

FOREIGN PATENT DOCUMENTS

CN   101278575   10/2008
JP   2009504049   1/2009
(Continued)

OTHER PUBLICATIONS

The State Intellectual Property Office of the People's Republic of China Application Serial No. 201080007634.X, Office Action dated Jul. 25, 2013, 7 pages.

(Continued)

*Primary Examiner* — Wayne Cai
*Assistant Examiner* — Chuck Huynh
(74) *Attorney, Agent, or Firm* — Lee, Hong, Degerman, Kang & Waimey

(57) ABSTRACT

Disclosed is a communication technique using the change of type of a femto base station. The femto base station is able to change the type of CSG opening/closing depending on conditions, and broadcasts the information on the change. A terminal is able to determine the network entry/handover to a corresponding femto cell by using the broadcasted information. The change of cell type of a CSG femto cell can be used when interference adjustment is required depending on the resource conditions of a femto cell.

17 Claims, 11 Drawing Sheets

(56) References Cited

U.S. PATENT DOCUMENTS

2008/0051088 A1 2/2008 Tariq et al.
2011/0280223 A1* 11/2011 Maeda et al. ............... 370/335

FOREIGN PATENT DOCUMENTS

| JP | 2010525752 | 7/2010 |
| KR | 20080040655 | 5/2008 |
| KR | 20100078520 | 7/2010 |
| WO | 2008134281 | 11/2008 |
| WO | 2009057602 | 5/2009 |

OTHER PUBLICATIONS

Qualcomm Europe, "Signalling support for open HeNB deployments", 3GPP TSG-RAN WG2 #62bis, R2-083883, Aug. 2008, 3 pages.

NTT DOCOMO, et al., "CSG with limited open access", 3GPP TSG RAN WG2 #60, Tdoc-R2-075150, Nov. 2007, 2 pages.

* cited by examiner

COMMUNICATION TECHNIQUE USING CHANGE OF TYPE OF FEMTO BASE STATION

CROSS-REFERENCE TO RELATED APPLICATIONS

This application is the National Stage filing under 35 U.S.C. 371 U.S. national stage application of International Application No. PCT/KR2010/000904, filed on Feb. 12, 2010, which claims the benefit of earlier filing date and right of priority to Korean Application No. 10-2010-0013171, filed on Feb. 12, 2010, and also claims the benefit of U.S. Provisional Application Ser. Nos. 61/292,833, filed on Jan. 6, 2010, 61/180,883, filed on May 24, 2009, and 61/151,851, filed on Feb. 12, 2009, the contents of which are all hereby incorporated by reference herein in their entirety.

TECHNICAL FIELD

The present invention relates to a technology for performing communication of a specific femto Base Station (BS) or a specific Mobile Station (MS) in a mobile communication system including a macro BS, one or more femto BSs, and one or more MSs.

BACKGROUND ART

A femto BS is a small-size version of the macro BS which performs most of the functions of the macro BS and which may be installed in a region covered by the macro BS or installed in a dead zone which is not covered by the macro BS. femto BSs have an independently-operated network architecture and a much greater number of femto BSs than relay base stations may be installed downtown or indoors.

FIG. 1 illustrates the configuration of a wireless communication system having femto Base Stations (BSs).

Referring to FIG. 1, the wireless communication system may include a femto BS 110, a macro BS, a Femto Network Gateway (FNG) 130, an Access Service Network (ASN) 140, and a Connectivity Service Network (CSN) 150. The macro BS is a legacy BS in a conventional wireless communication system.

It is assumed that the femto BS 110 directly accesses a Transmission Control Protocol/Internet Protocol (TCP/IP) network and independently operates like the macro BS and the femto BS 110 covers 0.1 m to 30 m and may serve 10 to 20 MSs. The femto BS 110 may operate in the same frequency as the macro BS (in the case of intra FA) or a different frequency from the macro BS (in the case of inter FA).

The femto BS 110 is connected to the macro BS via an R1 interface for receiving a downlink channel from the macro BS and transmitting a control signal to the macro BS.

The femto BS 110 may cover an indoor area or a shadowing area that the macro BS cannot cover, and may also support high-rate data transmission. The femto BS 110 may be overlaid on a macro cell or installed non-overlaid in an area that the macro BS does not cover.

There are two types of femto BSs, Closed Subscriber Group (CSG) femto BSs and Open Subscriber Group (OSG) femto BSs. The CSG femto BS groups MSs that can access the CSG femto BS and assigns a CSG Identification (ID) to the group of MSs. Hence, the CSG femto BS may discriminate MSs having the CSG ID against MSs having no CSG ID when they access the CSG femto BS. On the other hand, all MSs can access the OSG femto BS.

The FNG 130, which is a gateway for controlling the femto BS 110, is connected to the ASN 140 and the CSN 150 via an Rx interface and an Ry interface, respectively. The femto BS 110 may receive a service from the CSN 150 through the FNG 130. A Mobile Station (MS) connected to the femto BS 110 may receive services such as authentication, Internet protocol Multimedia Subsystem (IMS) service, etc., from the FNG 130 or the CSN 150.

The CSN 150 may provide connectivity to an application service such as the Internet, Voice over IP (VoIP), etc, and provide authentication and billing functions to the MS. The ASN 140 may control the macro BS and manage a connection between the macro BS and the CSN 150.

The CSG type femto BSs may be classified into two types according to accessibility by non-member AMSs, i.e., AMSs having no CSG ID.

The CSG-closed femto BS (or ABS) is a type of femto ABS which allow access only by member AMSs. An AMS may store CSG-closed femto ABSs IDs, which permit access by the AMS, in a white list.

On the other hand, the CSG-open femto BS (or ABS) is a type of femto ABS that preferentially supports services for member AMSs and also permits access by non-member AMSs when resources are sufficient. However, the CSG-open femto ABS may differentiate the service level for member AMSs from the service level for non-member AMSs.

In the current mobile communication system using femto ABSs, it is assumed that the two CSG type femto ABSs, which are classified according to accessibility by non-member AMSs as described above, are fixed. CSG-open/closed femto ABSs can be discriminated through partition information in an Advanced Air Interface System Configuration Descriptor (AAI_SCD).

On the other hand, in the case where macro and femto ABSs are installed in the same frequency region, non-member CSG AMSs connected to the macro ABS may undergo interference from neighboring femto ABSs. In this case, the macro ABS may control interference to AMSs by preventing the femto ABSs from using a specific resource region.

DISCLOSURE

Technical Problem

In the current standard, it is assumed that the CSG open/closed type of a CSG femto ABS is fixed as described above. However, it is preferable that it be possible to change (or switch) the CSG open/closed type of a femto ABS.

For example, while a CSG-closed femto ABS can accommodate non-member AMSs since the CSG-closed femto ABS has sufficient resources, a CSG-open femto ABS may need to reject access by non-member AMSs since resources of the CSG-open femto ABS have been exhausted. In this case, the CSG femto ABS is allowed to change its CSG type and to broadcast the change information to allow non-member AMSs to efficiently perform communication.

In another example, if it is possible not only to perform the above-described interference mitigation (or adjustment) but also to change the type of a CSG-closed femto ABS to a CSG-open femto ABS in the case where a non-member CSG AMS connected to a macro ABS undergoes interference from neighbor femto ABSs since the macro ABS and femto ABSs are installed in the same frequency region, the AMS can perform handover/network entry to the femto ABS.

Technical Solution

In order to solve the above problems, an embodiment of the present invention suggests a communication method for a femto Advanced Base Station (ABS) in which a specific femto ABS performs communication in a mobile communication system including a macro ABS, one or more femto ABSs, and one or more Advanced Mobile Stations (AMSs), the communication method including broadcasting first cell type information indicating that the specific femto ABS is a Closed Subscriber Group (CSG) femto ABS from among an Open Subscriber Group (OSG) femto ABS and the CSG femto ABS, broadcasting second cell type information indicating that the specific femto ABS operates as a first type from among the first type and a second type that are classified by accessibility of non-member AMSs to the specific femto ABS, changing the first type of the specific femto ABS to the second type under a specific condition, and transmitting a signal indicating change of the second cell type information of the specific femto ABS to at least one of the one or more AMSs and the macro ABS.

Here, the CSG femto ABS which operates as the first type may be a CSG-closed femto ABS, and the CSG femto ABS which operates as the second type may be a CSG-open femto ABS. Contrarily, the CSG femto ABS which operates as the first type may be a CSG-open femto ABS, and the CSG femto ABS which operates as the second type may be a CSG-closed femto ABS.

In the former case, the specific condition may include a degree of resources available to the specific femto ABS or an interference mitigation (or adjustment) state of a non-member AMS that undergoes interference by the specific femto ABS and the communication method may further include broadcasting a first type femto cell bar bit indicating that only access of member AMSs to the specific femto ABS is permitted from among access of member AMSs and access of non-member AMSs to the specific femto ABS or a second type femto cell bar bit indicating that both access of member AMSs and access of non-member AMSs to the specific femto ABS are not permitted when the degree of resources available to the specific femto ABS are insufficient.

In addition, the communication method may further include receiving, from the macro ABS, mode change request information or interference mitigation information for a specific non-member AMS that undergoes interference by the specific femto ABS, changing the type of the specific femto ABS to the second type under the specific condition, and performing a handover procedure with the specific non-member AMS.

Another embodiment of the present invention suggests a communication method for an Advanced Mobile Station (AMS) in which a specific AMS performs communication in a mobile communication system including a macro Advanced Base Station (ABS), one or more femto ABSs, and one or more AMSs, the communication method including receiving first cell type information indicating that a specific femto ABS is a Closed Subscriber Group (CSG) femto ABS from among an Open Subscriber Group (OSG) femto ABS and the CSG femto ABS, receiving second cell type information indicating that the specific femto ABS operates as a first type from among the first type and a second type that are classified by accessibility of non-member AMSs to the specific femto ABS, receiving a signal indicating change of the second type information indicating that the type of the specific femto ABS has been changed to the second type, and determining, by the specific AMS, whether or not to access the specific femto ABS according to the signal indicating the change of the second type information.

The CSG femto ABS which operates as the first type may be a CSG-closed femto ABS, and the CSG femto ABS which operates as the second type may be a CSG-open femto ABS.

The specific AMS may be a non-member for the specific femto ABS. In this case, the communication method may further include transmitting specific information of the specific femto ABS to the macro ABS when the specific femto ABS which operates as the first type causes interference greater than a specific level, receiving a neighbor ABS scan command from the macro ABS that has detected that the specific femto ABS has changed to the second type, reporting a scan result corresponding to the neighbor ABS scan command to the macro ABS, and receiving a command to perform handover to the specific femto ABS from the macro ABS.

Another embodiment of the present invention suggests a specific femto Advanced Base Station (ABS) apparatus that performs communication in a mobile communication system including a macro ABS, one or more femto ABSs, and one or more Advanced Mobile Stations (AMSs), the femto ABS apparatus including a processor for acquiring first cell type information indicating that the specific femto ABS is a Closed Subscriber Group (CSG) femto ABS from among an Open Subscriber Group (OSG) femto ABS and the CSG femto ABS and second cell type information indicating that the specific femto ABS operates as a first type from among the first type and a second type that are classified by accessibility of non-member AMSs to the specific femto ABS, performing a control operation for changing the first type of the specific femto ABS to the second type under a specific condition, and generating a signal indicating change of the second cell type information of the specific femto ABS when the type of the specific femto ABS has been changed to the second type, and a transmission module for receiving the first cell type information, the second cell type information, and the signal indicating the change of the second cell type information of the specific femto ABS from the processor and transmitting the received information to at least one of the one or more AMSs and the macro ABS.

Here, the CSG femto ABS which operates as the first type may be a CSG-closed femto ABS, and the CSG femto ABS which operates as the second type may be a CSG-open femto ABS.

In addition, the femto ABS apparatus may further include a reception module for receiving, from the macro ABS, mode change request information or interference mitigation information for a specific non-member AMS that undergoes interference by the specific femto ABS, wherein, when the reception module has received the interference mitigation information or the mode change request information, the processor may perform a control operation for changing the type to the second type under the specific condition and a control operation for performing a handover procedure with the specific non-member AMS.

Another embodiment of the present invention suggests a specific AMS apparatus that performs communication in a mobile communication system including a macro Advanced Base Station (ABS), one or more femto ABSs, and one or more AMSs, the specific AMS apparatus including a reception module for receiving first cell type information indicating that a specific femto ABS is a Closed Subscriber Group (CSG) femto ABS from among an Open Subscriber Group (OSG) femto ABS and the CSG femto ABS, second cell type information indicating that the specific femto ABS operates as a first type from among the first type and a second type that are classified by accessibility of non-member AMSs to the specific femto ABS, and a signal indicating change of the second cell type information indicating that the type of the specific femto ABS has been changed to the second type, and a processor for determining whether or not to access the specific femto ABS according to the signal indicating the change of the second cell type information.

Here, the CSG femto ABS which operates as the first type may be a CSG-closed femto ABS, and the CSG femto ABS which operates as the second type may be a CSG-open femto ABS.

In addition, the specific AMS may be a non-member for the specific femto ABS. In this case, the AMS apparatus may further include a transmission module for transmitting specific information of the specific femto ABS to the macro ABS when the specific femto ABS which operates as the first type causes interference greater than a specific level, wherein, when the reception module has received a neighbor ABS scan command from the macro ABS that has detected that the specific femto ABS has changed to the second type, the processor may perform a control operation for reporting a scan result corresponding to the neighbor ABS scan command to the macro ABS through the transmission module and performs a control operation for performing a procedure for handover to the specific femto ABS to the upon receiving a command to perform handover to the specific femto ABS from the macro ABS.

Advantageous Effects

According to the above-described method, it is possible to efficiently perform communication between a macro ABS, a femto ABS, and an AMS using CSG femto ABS type change.

BEST MODE

Figure 1:
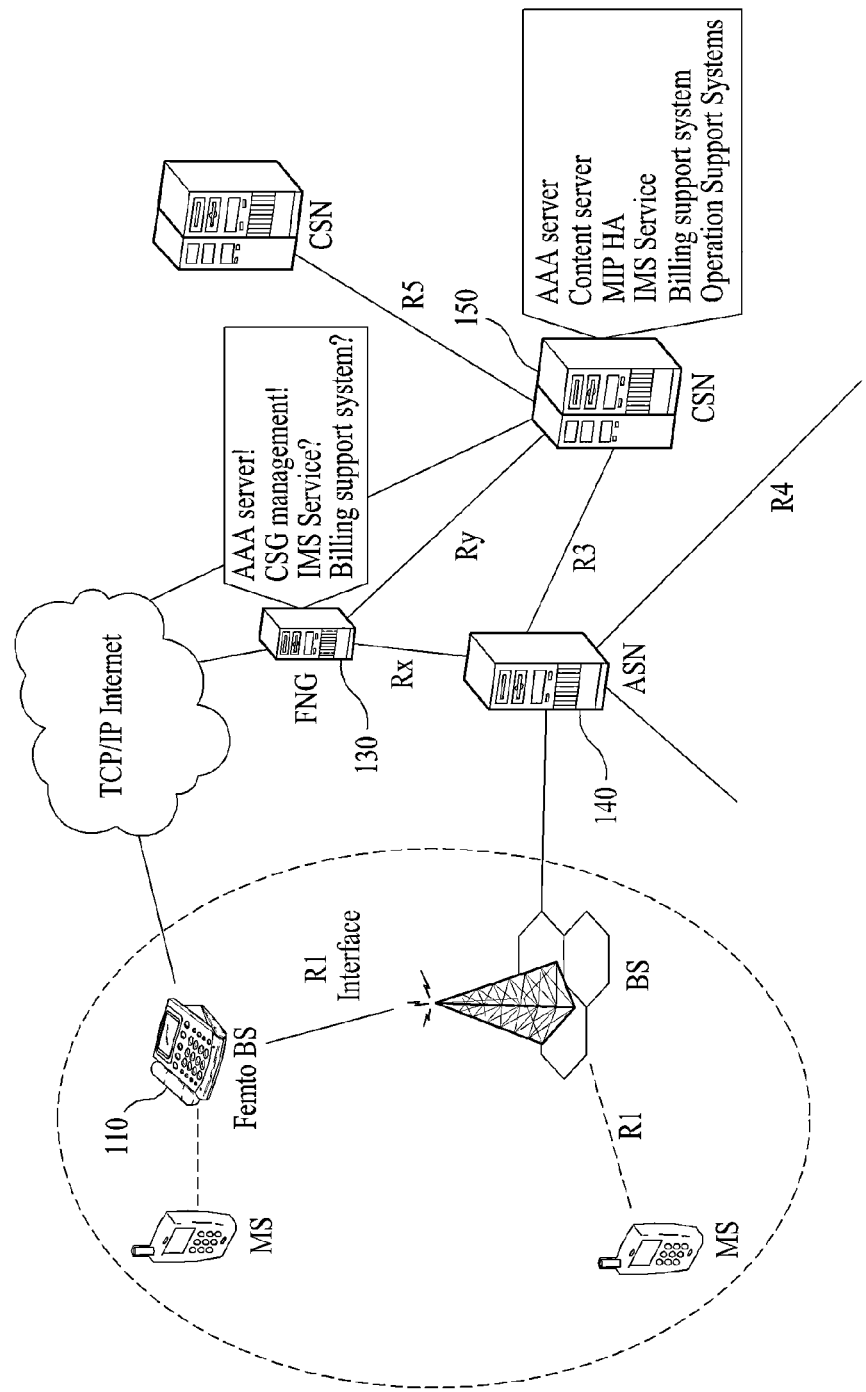
FIG. 1 illustrates the configuration of a wireless communication system having femto Base Stations (BSs).

Various embodiments of the present invention will now be described in detail with reference to the accompanying drawings so that those skilled in the art can easily practice the present invention. However, the present invention is not limited to the embodiments described below and can be implemented in various other forms. Portions which are not specifically related to the present invention will now be described in order to clearly explain the present invention and like reference numbers will be used throughout the drawings to refer to like parts.

The expression "a portion includes a specific component" used throughout this specification indicates that the portion may also include other components, rather than including the specific component alone, unless explicitly stated otherwise. The term "unit", "er(or)" or "module" used in this specification refers to a unit of performing at least one function or operation, which can be realized by hardware or software or by a combination of hardware and software.

Although the embodiments will be described assuming focusing on a mobile communication system complying with the IEEE 802.16m standard for ease of explanation, the present invention is not necessarily limited to the system complying with the IEEE 802.16m standard. Although a BS and an MS of the IEEE 802.16m system may be referred to as an Advanced BS (ABS) and an Advanced MS (ABS) for discrimination from an MS and a BS of the IEEE 802.16e system, they will also be simply referred to as a BS and an MS in the following embodiments of the present invention.

The CSG-open femto ABS and the CSG-closed femto ABS may be referred to as other words as long as the words discriminate between CSG femto ABSs which allow access by non-member AMSs and CSG femto ABSs which do not allow access by non-member AMSs.

In the following, various embodiments of a communication scheme using femto ABS type conversion are described based on the above description.

In a mobile communication system including one or more femto ABSs and one or more AMSs, a specific femto ABS may broadcast information indicating whether or not the specific femto ABS is an OSG femto ABS or a CSG femto ABS through a Superframe Header (SFH). When the specific femto ABS is a CSG femto ABS, the specific femto ABS may broadcast, through an AAI_SCD message, information indicating a CSG type in which the femto ABS operates from among the two types (for example, CSG open and closed types) which are classified based on accessibility of non-member AMSs.

In addition, it is assumed that a femto ABS according to an embodiment of the present invention may be configured as a CSG-closed femto type when the femto ABS desires to provide a service only to CSG members and the type of the femto ABS may be changed to a CSG-open femto type when resources of the CSG-closed femto ABS are sufficient such that it is also possible to provide a service to non-member AMSs. In the latter case, it is preferable that the femto ABS also notify the network and neighbor AMSs of the type change.

That is, when resources of the femto ABS which is in a CSG-closed mode are sufficient, the CSG mode of the femto ABS may be changed to a CSG-open mode so that the femto ABS allows a service to be also provided to non-member AMSs. For example, when an owner of a home CSG femto ABS desires to provide a service to a temporarily visited guest through the home CSG femto ABS. Here, there may be a need to change the femto type from the CSG-closed type to the CSG-open type and to provide a notification indicating the type change.

On the other hand, in the case where a CSG-open femto ABS is in a state in which it is not possible to provide a service to non-member AMSs even though it is a CSG-open femto ABS, i.e., in the case where the CSG-open femto ABS does not have sufficient resources for non-member AMSs, the CSG-open femto ABS needs to notify AMSs and the network that it is not possible to provide a service to further non-member AMSs although it is possible to provide a service to further CSG members.

Whether the CSG femto ABS is a CSG-open femto ABS or a CSG-closed femto ABS may be generally identified through "Type" and the CSG femto ABS may be allocated a preamble cell ID corresponding to a CSG open/closed type in a physical layer according to the operation mode of the CSG femto ABS. However, if a CSG femto ABS changes its cell type according to embodiments of the present invention, this may cause confusion in communication in the physical layer. Accordingly, in another embodiment of the present invention, it is possible to apply a method in which the CSG femto ABS may change only its operation mode without changing the cell type (i.e., while using a physically identifiable ID or the like without change). For example, it is possible to apply a method in which, in the case where a CSG femto ABS has been allocated a preamble cell identifier corresponding to a CSG-closed femto ABS, the CSG femto ABS may change its operation mode to that of the CSG open femto ABS to allow access by non-member AMSs. In this case, the CSG femto ABS may change its mode change using a different type of broadcast signal.

Accordingly, an embodiment of the present invention suggests that the femto ABS change the type/mode according to a state of the femto ABS and broadcast information regarding the type/mode change so as to request that AMSs not perform unnecessary network access based on the broadcast information or so as to notify AMSs of femto ABSs which permit network access. Although the following description will be given focusing upon the case where a femto ABS changes the "type" according to a state of the femto ABS for ease of explanation, it is assumed in the following description that the present invention is similarly applied to the case where the femto ABS changes only the "mode" while maintaining the "type", unless specifically otherwise stated.

Methods in which type change of a CSG femto ABS is used according to a state (for example, a resource state) of the femto ABS as described above.

<First Aspect—Type Change According to Femto ABS Situation>

Figure 2:
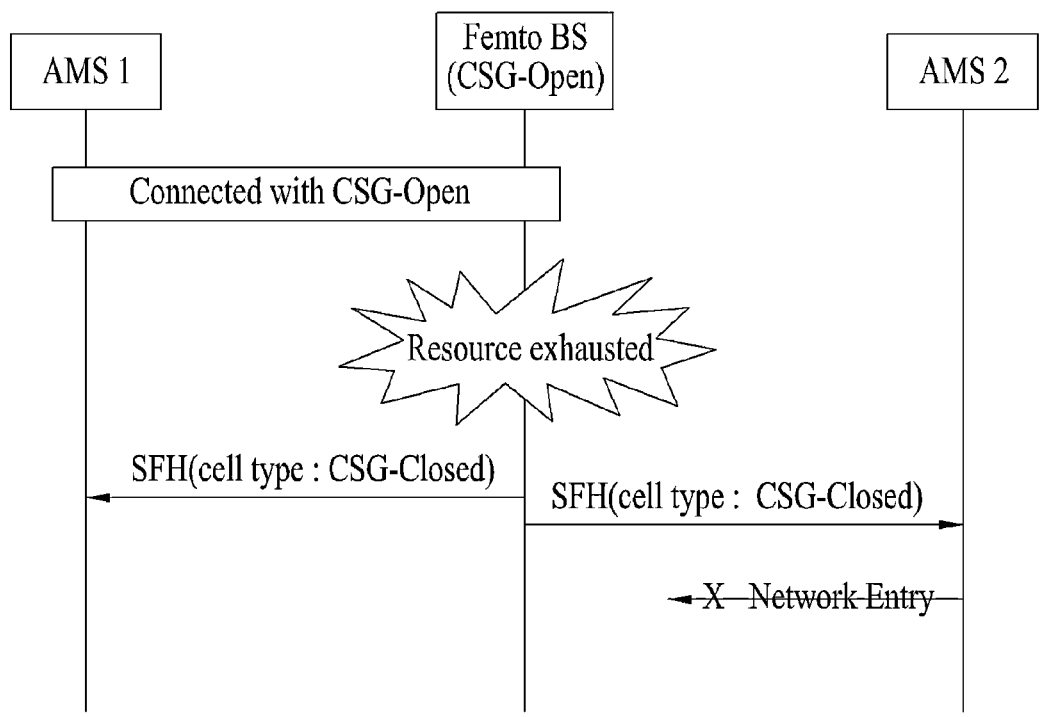
FIG. 2 shows a method in which a CSG-open femto ABS is changed to a CSG-closed femto ABS and notifies an AMS of this type change to prevent unnecessary network entry or handover of the AMS according to an embodiment of the present invention.

FIG. 2 shows a method in which a CSG-open femto ABS is changed to a CSG-closed femto ABS and notifies an AMS of this type change to prevent unnecessary network entry or handover of the AMS according to an embodiment of the present invention.

In FIG. 2, it is assumed that a first AMS (AMS 1) is a CSG member AMS and a second AMS (AMS 2) is a non-member AMS. In addition, it is assumed that the first AMS is connected to a CSG-open femto ABS.

If resources of the CSG-open femto ABS have been exhausted, the femto ABS according to this embodiment may be changed to a CSG-closed femto ABS and notify the first and second AMSs of the type change. The type of the femto ABS may be changed according to the state of the femto ABS (for example, according to the state of resources of the femto ABS) or may be changed according to a command from a macro ABS. Although FIG. 2 shows that type change information of the femto ABS is broadcast through an SFH, the type change may also be broadcast through an AAI-SDC message or another message. This can be considered as serving similar to a cell bar indicator that the macro ABS uses to prohibit access by an AMS.

The second AMS, which has received the type change information of the femto ABS as described above, may do not attempt to unnecessary handover or entry to the femto ABS.

Figure 3:
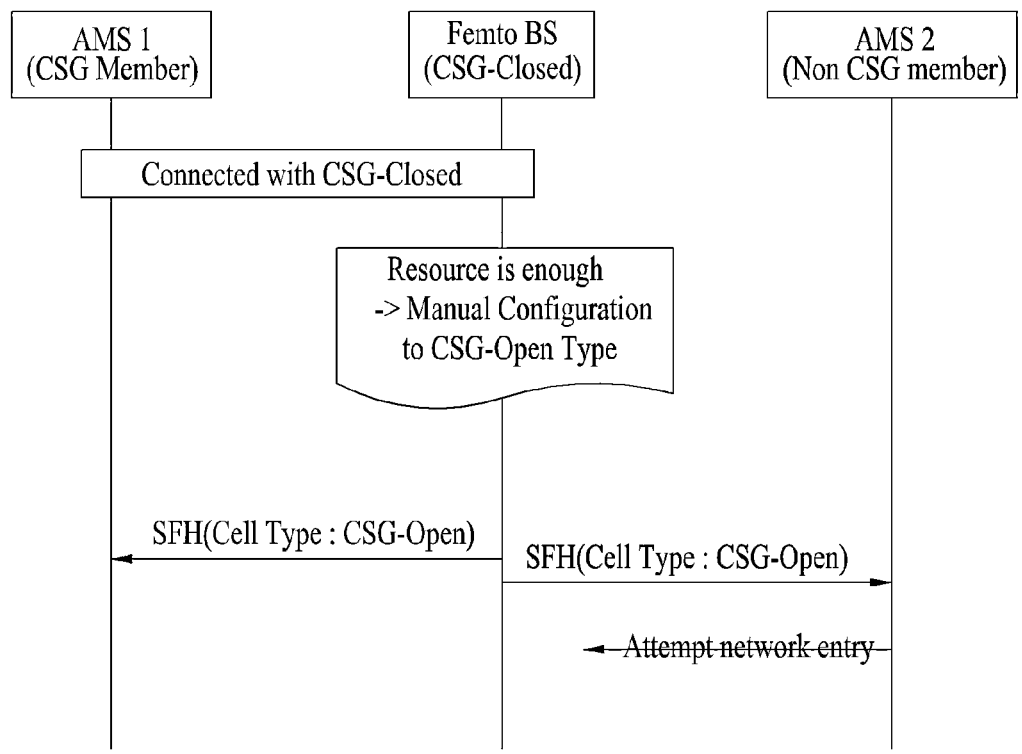
FIG. 3 shows a method in which a CSG-closed femto ABS is changed to a CSG-open femto ABS and notifies an AMS of this type change to permit network entry or handover of the AMS according to an embodiment of the present invention.

FIG. 3 shows a method in which a CSG-closed femto ABS is changed to a CSG-open femto ABS and notifies an AMS of this type change to permit network entry or handover of the AMS according to an embodiment of the present invention.

Similar to FIG. 2, it is assumed in FIG. 3 that a first AMS (AMS 1) is a CSG member AMS and a second AMS (AMS 2) is a non-member AMS. In addition, it is assumed that the first AMS is connected to a CSG-open femto ABS.

According to this embodiment, the type of the CSG-closed femto ABS may be changed when resources of the CSG-closed femto ABS are sufficient or when the user desires to change the femto type to provide a service to a larger number of AMSs through the femto ABS. FIG. 3 shows an example in which the type of the CSG-closed femto ABS is changed to a CSG-open and this type change is broadcast through an SFH to provide a network entry chance to a second AMS (AMS 2) which is a non-member AMS. The changed cell type may be transmitted not only through an SFH but also a different broadcast message or an MAC message.

At the time when the CSG-open femto ABS cannot accommodate further non-member AMSs, the femto type is changed from the CSG-open type to the CSG-closed type and the type change is broadcast through an SFH, thereby achieving the same effects as when a cell bar indication is used as described above.

The following is a description of a method of using a CellBar bit independent of such type change of the CSG femto ABS.

Figure 4:
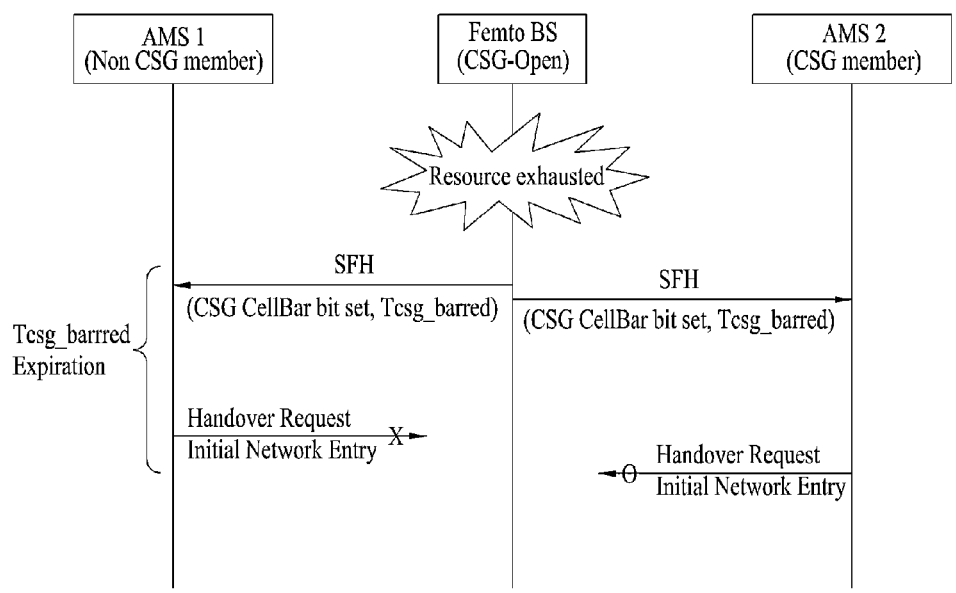
FIG. 4 illustrates a method in which a CSG-open femto ABS prohibits network entry/handover of non-member AMSs using a CSG CellBar according to resource state of the CSG-open femto ABS without cell type change according to an embodiment of the present invention.

FIG. 4 illustrates a method in which a CSG-open femto ABS prohibits network entry/handover of non-member AMSs using a CSG CellBar according to resource state of the CSG-open femto ABS without cell type change according to an embodiment of the present invention.

The CSG-open femto ABS may broadcast a CSG CellBar bit indicating 'on' (for example, a CSG CellBar bit set to '1') through an SFH at the time when it is not possible to provide a service to non-CSG-member AMSs. In addition, in this embodiment, a Tcsg_barred timer indicating a period during which access by non-member CSG AMSs is prohibited is broadcast together with the CSG CellBar bit. The Tcsg_barred timer may indicate that access by non-CSG-member AMSs (for example, a handover or initial network entry request) is rejected until the timer expires. However, this embodiment suggests that access by CSG member AMSs be permitted even when the CSG CellBar bit is on.

Figure 5:
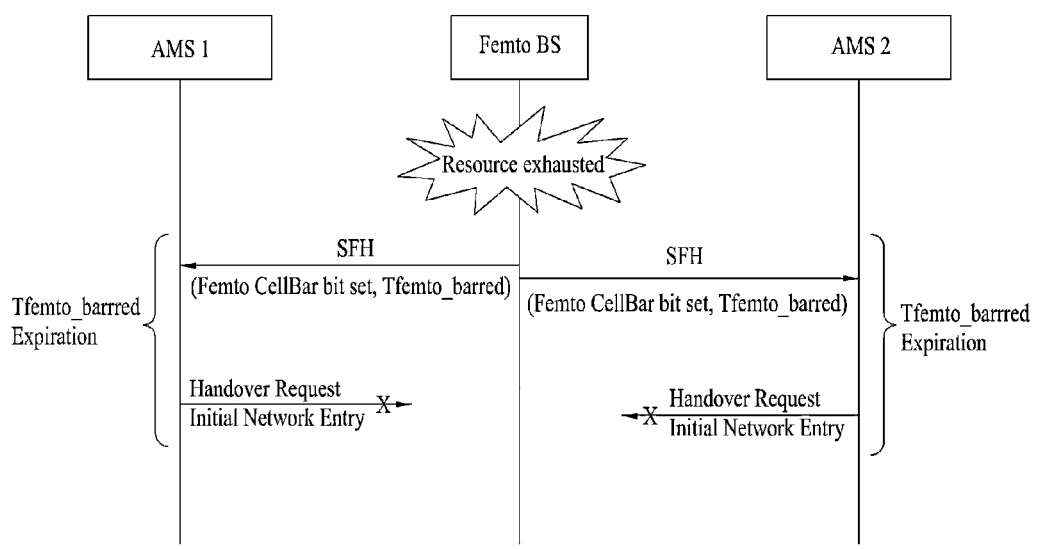
FIG. 5 illustrates a method in which a femto ABS uses the same CellBar bit as a CellBar bit used by a macro ABS according to another embodiment of the present invention.

FIG. 5 illustrates a method in which a femto ABS uses the same CellBar bit as a CellBar bit used by a macro ABS according to another embodiment of the present invention.

Here, it is assumed that the CellBar bit according to this embodiment prohibits not only access by non-member AMSs but also access by CSG member AMSs. That is, the femto ABS may broadcast a femto CellBar bit set to "0" (for example, a femto CellBar bit set to "1") through an SFH for cell load balance.

Neighbor AMSs which have received the CellBar bit need to avoid access to the femto ABS. Here, it is assumed that this state is maintained while a Tfemto barred timer transmitted together with the femto CellBar bit runs. That is, the femto CellBar bit according to this embodiment has a meaning unrelated to the type of the femto subscriber.

The following is a description of a method of indicating whether or not an AMS is a member according to another embodiment of the present invention.

Figure 6:
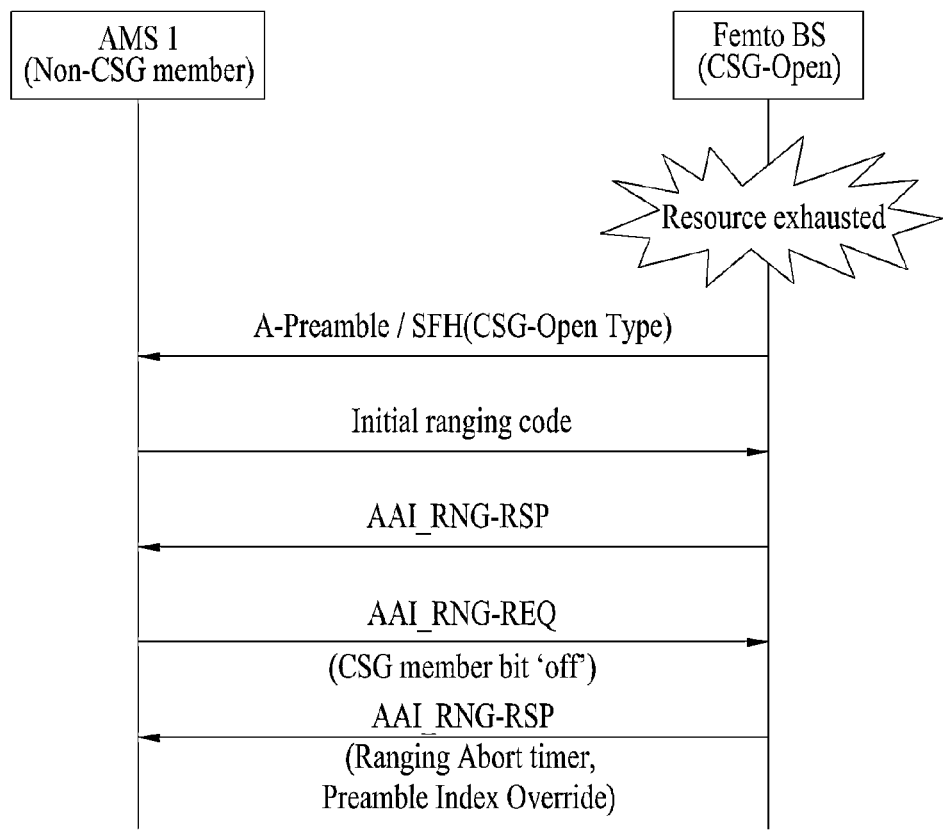
FIG. 6 illustrates a method in which an AMS transmits an indicator of whether or not the AMS is a member of a femto ABS and the femto ABS determines whether or not to permit access by the AMS based on the indicator according to an embodiment of the present invention.

FIG. 6 illustrates a method in which an AMS transmits an indicator of whether or not the AMS is a member of a femto ABS and the femto ABS determines whether or not to permit access by the AMS based on the indicator according to an embodiment of the present invention.

There may be a situation in which a CSG-open femto ABS cannot provide a further service to non-CSG-member AMSs. Non-CSG-member AMSs, which are not aware of this situation, may keep attempting to enter the network.

A non-CSG-member AMS according to this embodiment may transmit a CSG member bit set to "off" to indicate that the AMS is not a CSG member when transmitting an AAI_RNG-REQ message. A CSG-open femto ABS which has received this AAI_RNG-REQ message may transmit preamble index information in order to redirect it to another ABS together with a ranging abort timer in an AAI_RNG_RSP message.

Figure 7:
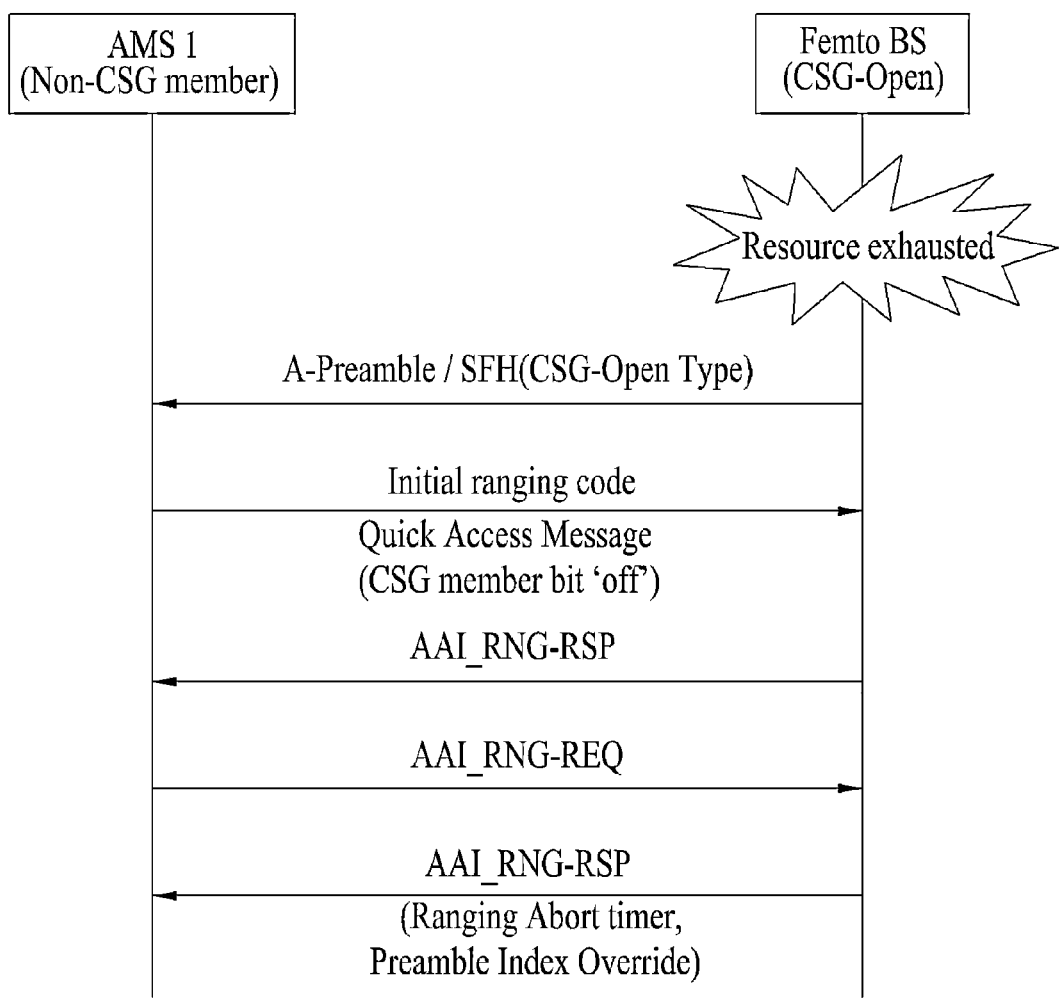
FIG. 7 illustrates a method in which an AMS provides a notification indicating whether or not the AMS is a member according to another embodiment of the present invention.

FIG. 7 illustrates a method in which an AMS provides a notification indicating whether or not the AMS is a member according to another embodiment of the present invention.

The method of FIG. 7 is similar to that of FIG. 6 with the difference being that a CSG member bit is transmitted through a quick access message. Specifically, when performing network entry to a CSG-open ABS, a non-CSG-member AMS may transmit a message together with a ranging code. When a CSG member bit set to "off" is transmitted within a part of the message, the femto ABS may detect that the network entry is made by a non-member AMS. Accordingly, the femto ABS may reject access by the AMS through a ranging response message when non-member network entry is not possible.

The following is a description of a method for broadcasting a network entry condition of a CSG femto ABS is broadcast according to another aspect of the present invention.

Table 1 shows a method of broadcasting a network entry condition of a CSG-open femto ABS through an SFH. In this embodiment, it is assumed that a macro ABS or neighbor femto ABSs broadcast a triggering condition for handover to a CSG-open femto ABS.

TABLE 1

| Name | Length (bits) | Value |
|---|---|---|
| Type | 2 (MSB) | Trigger metric type:<br>0x0: CINR metric<br>0x1: RSSI metric<br>0x2: metric of the number of missed frames |
| Function | 2 | Calculation of trigger condition:<br>0x0: Metric of every neighbor ABS is greater than absolute value<br>0x1: Metric of every neighbor ABS is less than absolute value<br>0x2: Metric of every neighbor ABS has a relative value less than that of metric of serving ABS<br>0x3: Metric of serving ABS is greater than absolute value |
| Duration | 3 (LSB) | $2^p$ (p: The number of frames) |

In Table 1, "Type" is a field indicating a reference indicating a link state of a neighbor/serving ABS and may include a CINR, an RSSI, and the number of missed frames. Specifically, when the number of missed frames is measured as a value equal to or greater than a predetermined value, it may be used to estimate that the current state is a state in which the AMS cannot detect the ABS.

The duration field indicates that link state measurement is performed during $2^p$ frames in order to increase reliability of the result.

The following is a description of specific examples of a method of applying Table 1.

Example 1

In the Case of (Type/Function/Duration=0×2/0×3/$2^p$)

This indicates the case where the number of missed frames from all neighbor ABSs is greater than the absolute value during an interval of $2^p$ frames (i.e., the case where there is no neighbor ABS having a link state available for connection).

Example 2

In the Case of (Type/Function/Duration=0×0/0×1/$2^p$)

This indicates the case where CINRs obtained by measuring the link states of all neighbor ABSs are less than the absolute value (i.e., the case where there is no neighbor ABS having a CINR value which can maintain connection).

On the other hand, Table 2 shows a handover trigger condition transmitted by a conventional macro ABS.

TABLE 2

| Name | Length (Bits) | Value |
|---|---|---|
| Type | 2 (MSB) | Trigger metric type:<br>0x0: CINR metric<br>01: RSSI metric<br>0x2: Metric of the number of missed frames |
| Function | 2 | Calculation of trigger condition:<br>0x0: Reserved<br>0x1: Metric of neighbor ABS is greater than absolute value<br>0x2: Metric of neighbor ABS is less than absolute value |

TABLE 2-continued

| Name | Length (Bits) | Value |
|---|---|---|
| | | 0x3: Metric of neighbor ABS is greater than serving ABS metric by relative value |
| | | 0x4: Metric of neighbor ABS is less than serving ABS metric by relative value |
| | | 0x5: Metric of serving ABS greater than absolute value |
| | | 0x6: Metric of serving ABS less than absolute value |
| | | 0x7: Reserved |
| | | NOTE-0x1-0x4 not applicable for RTD trigger metricNOTE- |
| | | When type 0x1 is used together with function 0x3 or 0x4, the threshold value shall range from −32 dB (0x80) to +31.75 dB (0x7F). When type 0x1 is used together with function 0x1, 0x2, 0x5 or 0x6, the threshold value shall be interpreted as an unsigned byte with units of 0.25 dB, such that 0x00 is interpreted as −103.75 dBm and 0xFF is interpreted as -40 dBmNOTE- |
| | | Type 0x3 can only be used together with function 0x5 or function 0x6 |
| Duration | 3 (LSB) | Action performed upon reaching trigger condition: |
| | | 0x0: Reserved |
| | | 0x1: Respond on trigger with AAI_SCN-REP |
| | | 0x2: Respond on trigger with AAI_HO-REQ |
| | | 0x3: Respond on trigger with AAI_SCN-REQ |
| | | 0x4 : Declare ABS unreachable: If this ABS is the serving ABS(meaning the AMS is unable to maintain communication with the ABS), AMS sends AAI_HO-IND with code 0x03 to the serving ABS and proceeds as specified in section <<15.2.5.2.4>>. If this ABS is a target ABS, the AMS needs not take immediate action when this trigger condition is met for a single ABS. The AMS shall act only when this condition is met for all target ABSs included in AAI-HO-CMD during HO execution. |
| | | The specific actions are described in section <<15.2.5.2.4>>. |
| | | 0x5: Cancel HO0x6 and 0x7: ReservedNOTE-0x3 is not applicable when neighbor ABS metrics are defined (i.e., only Function values 0x5 or 0x6 are applicable). |

In Table 2, the section number indicates a description of the IEEE 802.16m standard.

An embodiment of the present invention suggests that a handover trigger condition transmitted by the macro ABS as shown in Table 2 to which functions shown in the following Table 3 are added be transmitted as a condition of triggering entry into a CSG-open femto ABS.

TABLE 3

| Name | Length (Bits) | Value |
|---|---|---|
| Type | 2 (MSB) | Trigger metric type: |
| | | 0x0: CINR metric |
| | | 0x1: RSSI metric |
| | | 0x2: Metric of the number of missed frames |
| Function | 2 | Calculation of trigger condition: |
| | | 0x0: Metric of every neighbor ABS is greater than absolute value |
| | | 0x7: Metric of every neighbor ABS is less than absolute value |
| Duration | 3 (LSB) | — |

In Table 3, functions 0x0 and 0x7 use values reserved in Table 2, which assumes that limitation is made to a condition for handover to the CSG-open femto ABS according to this embodiment. This also assumes that the CSG-open femto ABS is included in a neighbor list transmitted by the macro ABS.

The following is a description of a specific example of the trigger condition of Table 2 to which that of Table 3 is added.

Example 1

In the Case of (Type/Function/Operation=0×2/0×0/Handover)

This indicates the case where the number of missed frames from all neighbor ABSs other than the CSG-open femto ABS is greater than the absolute value (i.e., the case where it is not possible to detect neighbor ABSs other than the CSG-open femto ABS).

Example 2

In the Case of (Type/Function/Operation=0×0/0×7/Handover)

This indicates the case where measured CINRs of all neighbor ABSs other than the CSG-open femto ABS is less than the absolute value.

<Second Aspect—Utilization for Interference Mitigation or Adjustment>

The following is a description of the case where cell type change is performed for the sake of interference mitigation (or adjustment) when an AMS connected to a macro cell is using a femto cell region according to a second aspect of the present invention. In the following description, the term "cell" may be used to indicate a region (coverage) covered by an ABS or the like and may also be used to indicate an entity that provides a service to the coverage.

The macro cell may allow the femto cell to fixedly reserve a frame (such that the frame of the femto cell is always reserved) or to dynamically reserve a frame (such that the frame of the femto cell is reserved at a request from the AMS) in order to prevent interference by a femto cell that the AMS has approached. Here, the AMS may report a measured interference level to the macro cell. It is possible to reserve the resources of the femto cell through nulling in order to prevent interference of the femto cell through signaling between the macro cell and the femto cell based on the reported interference level.

If the femto cell has sufficient resources such that type change is made to a CSG-open state which allows access by non-member users and corresponding identification information is broadcast, the AMS which has received the broadcast information may perform handover to a femto cell such that the femto cell no longer needs to reserve the corresponding frame (in the case of dynamic frame reservation).

Alternatively, the macro cell which has received CSG-open state information may provide a scan command to the AMS in order to allow handover of the AMS. Here, the scan command message may include information of a femto cell to be scanned such as a preamble and a BS ID. This feature is in contrast to the fact that the macro ABS does not separately transmit a scan command during FA (intra FA) scanning and does not allocate a scan interval and does not provide preamble and ABS ID information.

According to this embodiment, a femto ABS list may not be included in a neighbor ABS list that is broadcast by the macro serving ABS. Therefore, the provision of information of a femto cell to be scanned by an AMS through a scanning message allows the AMS to more efficiently perform femto cell scanning.

In addition, when information for scanning is provided while scan duration=0, the AMS may report the scanning result to the macro cell. This may be in contrast to the fact that, in the case of the conventional ABS, information of an ABS to be scanned is not separately provided within a scanning response message although the ABS may request the AMS to provide a scanning result report through a non-request scanning response message. Upon receiving the scan result, the macro cell may instruct the AMS to perform handover to the corresponding femto cell based on the received scan result information. The macro cell may also instruct the femto cell to release reservation of a frame for the AMS.

The following is a description of various examples of the methods according to this aspect.

Embodiment 1

When a Femto CSG Type Indicator is Broadcast

In this embodiment, it is assumed that an AMS attempts handover or network entry according to femto ABS type (OSG, CSG open, or CSG closed). The AMS may determine whether or not it is possible to perform handover or network entry to the corresponding CSG femto cell by receiving broadcast control information of the CSG femto (superframe header or broadcast channel) after measuring signal quality through CSG femto cell scanning. According to this embodiment, it is possible to prevent an increase in signaling overhead since non-member AMSs do not attempt unnecessary handover or network entry to a CSG-closed femto cell.

The AMS needs to perform not only macro cell scanning but also femto cell scanning in order to determine whether or not it is possible to perform handover or network (re)entry to a neighbor femto cell. This may increase signaling overhead. Separately from the AMS-initiated handover to a femto cell, ABS-initiated handover and femto cell scanning of the AMS by the macro cell may be triggered when the femto cell CSG type has changed from the closed type to the open type.

Embodiment 2

When a Femto CSG Type Indicator is Not Broadcast

In this embodiment, it is assumed that the AMS does not receive information regarding the femto CSG type from a macro cell or a femto cell. Handover or (re)entry of the AMS to the femto cell may be controlled by the macro cell and the femto cell. A member AMS may store information a CSG femto cell of the AMS and perform handover or network (re)entry to the CSG femto cell.

In the case where a member AMS attempts handover or network (re)entry to a femto CSG closed type after receiving a femto reference signal or performing scanning, access of the AMS may be restricted by the femto cell. This may be accomplished through a ranging response message of the femto cell in an uplink ranging procedure of the AMS.

When access by the AMS is rejected by a specific femto cell, the AMS may do not reattempt access and ABS-initiated handover and femto cell scanning of the AMS may be triggered by the macro cell when the femto CSG type has changed from the closed type to the open type.

Embodiment 3

Figure 8:
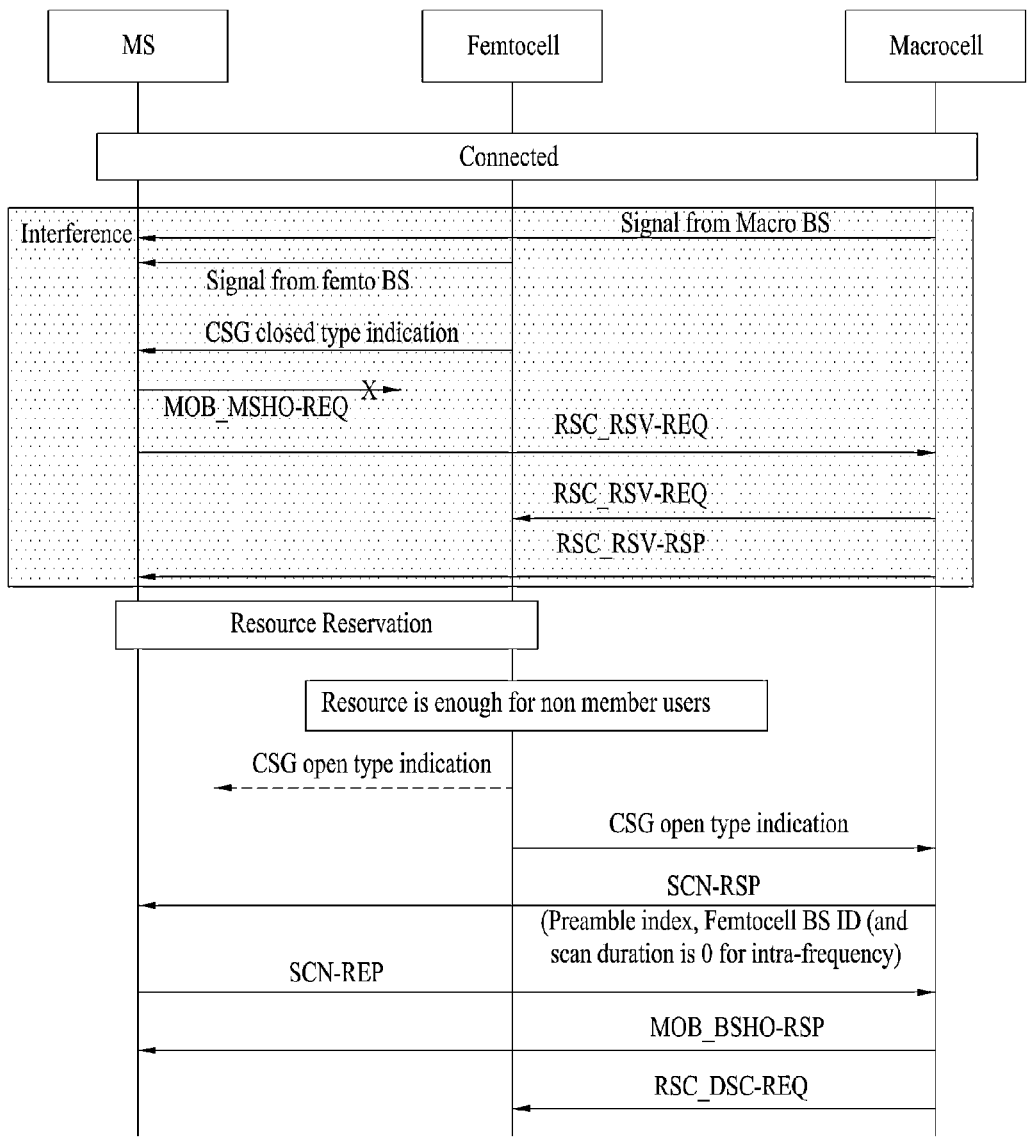
FIG. 8 illustrates a method in which CSG femto ABS type is changed from the closed type to the open type in a state in which resources of the femto ABS have been reserved for interference mitigation (or adjustment) and accordingly the AMS performs handover to the femto ABS.

In the Case Where a CSG Type Indicator is Broadcast in a State in Which Resources of a Femto ABS have been Reserved for Interference Mitigation FIG. 8 illustrates a method in which CSG femto ABS type is changed from the closed type to the open type in a state in which resources of the femto ABS have been reserved for interference mitigation and accordingly the AMS performs handover to the femto ABS.

In the embodiment illustrated in FIG. 8, it is assumed that the AMS is connected to a macro ABS. A non-member AMS which is connected to the macro ABS may undergo not only interference by the macro ABS but also interference by a neighbor CSG closed femto ABS. The CSG closed femto ABS may broadcast an indicator indicating that it is a CSG closed femto ABS and thus the AMS may do not perform handover to the femto ABS.

In this situation, the AMS may send an interference mitigation request, together with information identifying a femto ABS which causes interference to the AMS, to the macro ABS. This may allow the macro ABS to reserve a specific frame of the femto ABS to temporarily reduce interference undergone by the AMS.

When resources of the CSG closed femto ABS are sufficient such that it is possible to change the cell type, the femto ABS may change the cell type to the CSG-open femto type and then may broadcast a signal indicating the cell type change. In the case where the macro ABS has received the signal indicating the cell type change of the femto ABS, the macro ABS may provide a scanning command to the AMS to allow the AMS to scan the femto ABS and report the scanning result. Upon receiving the scanning result from the AMS, the macro ABS may instruct the AMS to perform handover. On the other hand, in the case where the AMS according to this embodiment has received an indicator indicating that the type of the femto ABS has changed to the CSG-open type from the femto ABS, the AMS may perform scanning without help of the macro ABS and may request handover to the corresponding femto ABS.

Embodiment 4

Figure 9:
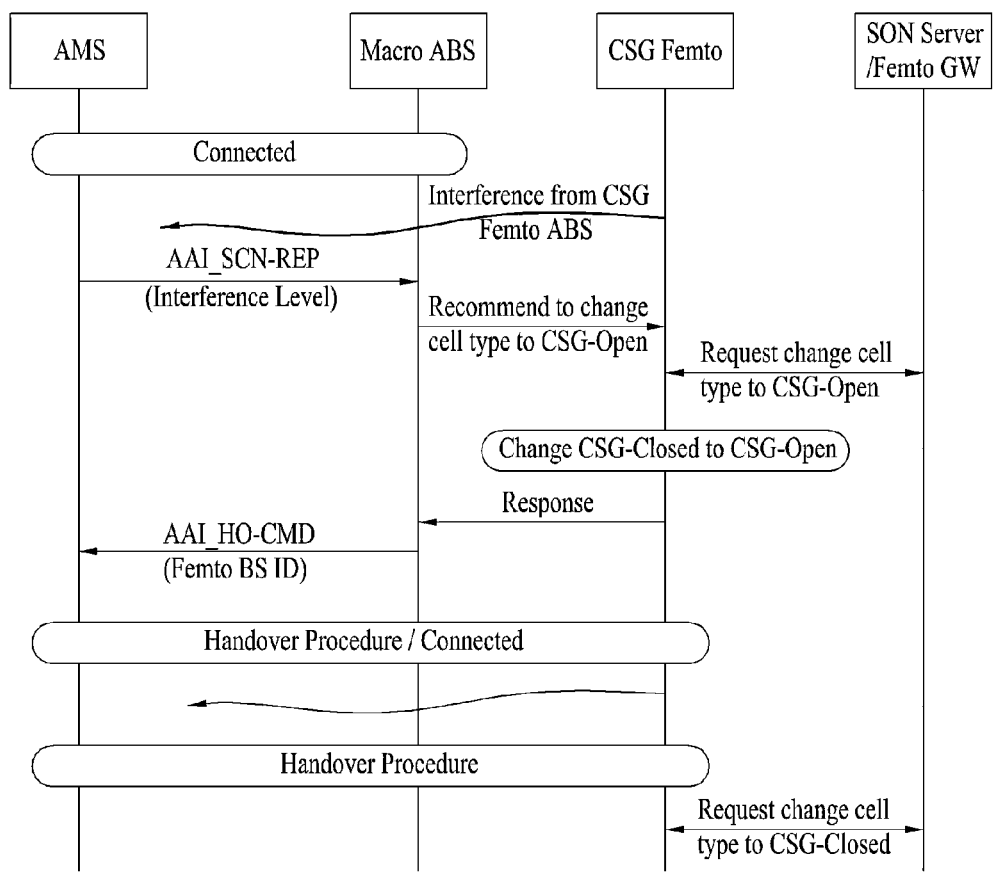
FIG. 9 illustrates an interference mitigation method using cell type change of the femto ABS in a situation in which an AMS is connected to a macro ABS and resource reservation for interference mitigation has not been performed in the femto ABS.

Interference Mitigation Due to Cell Type Change in a Situation in which Resource Reservation for Interference Mitigation has not been Performed FIG. 9 illustrates an interference mitigation method using cell type change of the femto ABS in a situation in which an AMS is connected to a macro ABS and resource reservation for interference mitigation has not been performed in the femto ABS.

In this embodiment, it is assumed that the AMS is connected to the macro ABS.

An AMS which is connected to an overlaid macro ABS may undergo serious interference from a CSG-closed femto ABS in the region of the macro ABS. That is, since the CSG-closed ABS does not allow access by the AMS, the AMS undergoes serious interference when the AMS is located near the femto ABS in a state in which it is not possible to perform handover.

Here, the AMS may transmit a femto ABS ID and an interference level to the macro ABS through an AAI_SCN-REP message. Here, the AMS may simultaneously transmit information regarding one or more femto ABSs. The form of an interference level to be reported may be transmitted using a metric (for example, a CINR) that is used in the scanning report. Accordingly, the macro ABS may recommend the CSG-closed femto ABS to change its type to the CSG-open femto type through a backbone network. Here, the type change request that the macro ABS sends to the femto ABS may include information indicating that the purpose of the type change request is to perform Interference Mitigation (IM).

The CSG-closed femto ABS may request a network entity such as a Self Organization Network (SON) server or a Femto GateWay (GW) to check whether or not cell type change is possible and may provide a response to the request to the macro ABS. In this embodiment, it is assumed that cell type change is possible such that the CSG-closed cell type is changed to the CSG-open cell type.

Upon receiving the response, the macro ABS may instruct the AMS to perform handover to the femto ABS. Alternatively, the CSG femto ABS which has changed its cell type may provide a notification indicating that the cell type of the CSG femto ABS has been changed through a broadcast message and the AMS which has directly received the broadcast message may then request the macro ABS which is the current serving ABS to perform handover to the CSG-open femto ABS. Once the AMS performs handover according to the above embodiment, the AMS may no longer undergo interference.

On the other hand, when the AMS requests handover to another ABS while being kept connected to the CSG-open femto ABS, i.e., when the AMS desires to exit the CSG-open femto ABS, the CSG-open femto ABS may again request that the SON server or the femto GW perform cell type change and then may return the type to the CSG-closed femto type.

Embodiment 5

Figure 10:
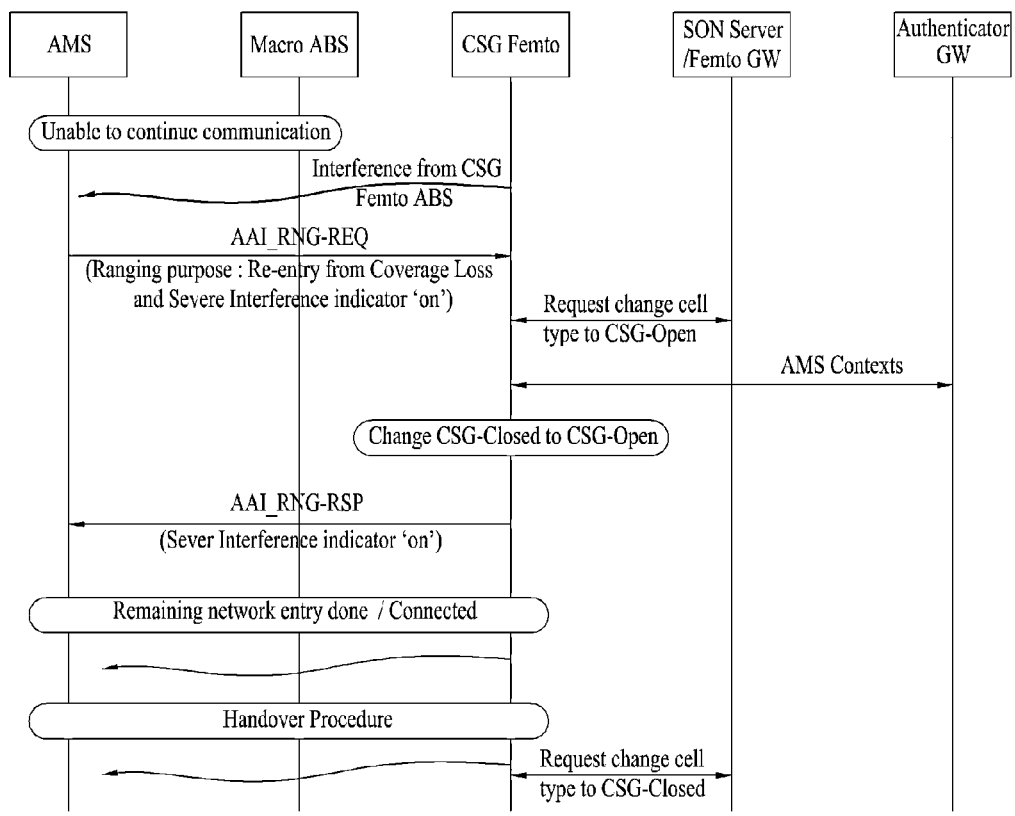
FIG. 10 illustrates a method in which interference mitigation is performed due to cell type change of the femto ABS in a situation in which an AMS is not connected to a macro ABS and resource reservation for interference mitigation has not been performed in the femto ABS.

Interference Mitigation Due to Cell Type Change in a Situation in which Resource Reservation for Interference Mitigation has not been Performed FIG. 10 illustrates a method in which interference mitigation is performed due to cell type change of the femto ABS in a situation in which an AMS is not connected to a macro ABS and resource reservation for interference mitigation has not been performed in the femto ABS.

In this embodiment, it is assumed that the AMS is not connected to the macro ABS.

Similar to the above embodiment 4, an AMS which is connected to an overlaid macro ABS may undergo serious interference from a CSG-closed femto ABS in the region of the macro ABS. That is, since the CSG-closed femto ABS does not allow access by the AMS, the AMS may undergo serious interference when the AMS is located near the femto ABS in a state in which it is not possible to perform handover. This may terminate communication with the macro ABS. Here, the AMS may perform scanning in order to attempt cell reselection. Here, only a CSG-closed femto ABS which does not permit access by the AMS may be present.

This embodiment suggests that the AMS transmit an Interference Mitigation (IM) request or a severe interference indicator while transmitting an AAI_RNG-REQ message to the femto ABS even though the AMS has detected that the femto ABS does not permit access by the AMS. Optionally, the AMS may perform a reentry procedure defined in the coverage loss while transmitting an interference mitigation request indicator. In this case, the network entry procedure may be performed in an optimized entry manner. A network entry ID (or network entity ID), which stores AMS information (AMS context) and an AMS ID that is used in an AMSID or DCR mode, or a last attached ABS ID which has assigned an AMS ID may be transmitted together to help restore the AMS information.

When the CSG-closed femto ABS has received the severe interference indicator or the IM request from the AMS as described above, the CSG-closed femto ABS may perform a process for changing the cell type to the CSG-open ABS type and may notify the AMS of the type change (for example, using an AAI_RNG-RSP message having a severe interference indicator set to "ON"). Thereafter, the AMS may perform general remaining network entry processes such as SBC, PKM, or REG.

The above aspects and the embodiments of each of the aspects may be used in combination according to circumstances.

The following is a description of a configuration of an apparatus for performing the described-above communication method for an AMS, a femto ABS, and a macro ABS.

Figure 11:
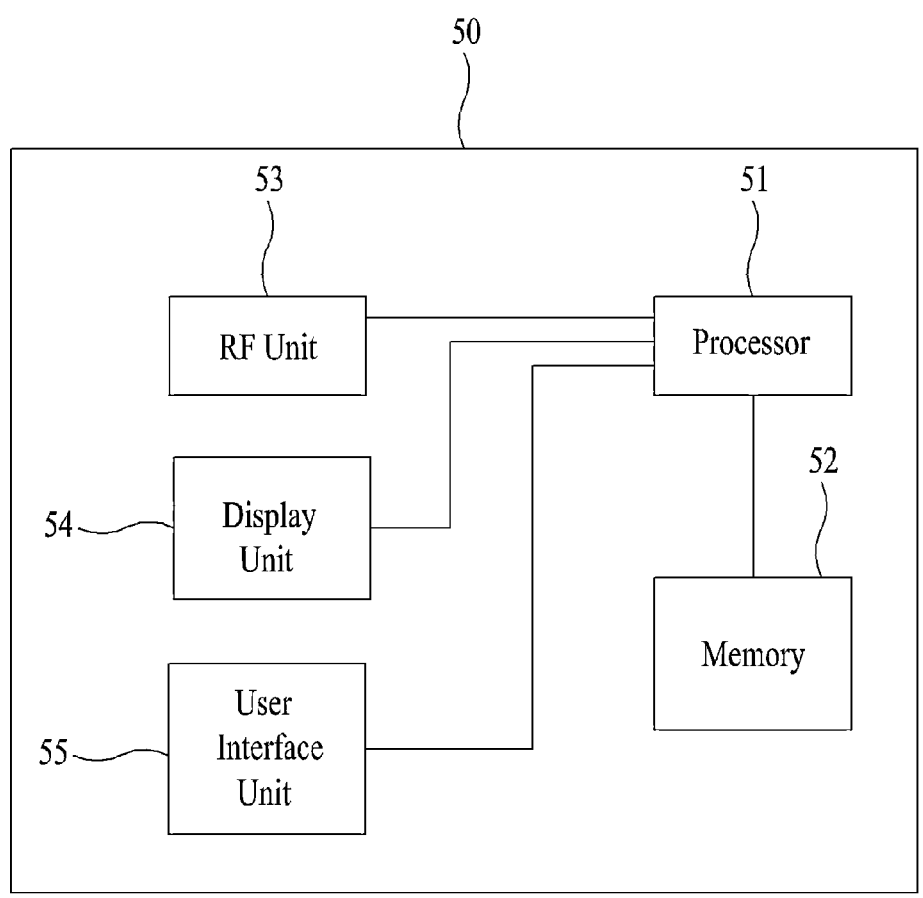
FIG. 11 schematically illustrates a configuration of an apparatus corresponding to each of the AMS, the femto ABS, and the macro ABS according to the embodiments of the present invention.

FIG. 11 schematically illustrates a configuration of an apparatus corresponding to each of the AMS, the femto ABS, and the macro ABS according to the embodiments of the present invention.

The apparatus 50 shown in FIG. 11 may be the AMS, the femto ABS, or the macro ABS described above in each of the embodiments. When the apparatus 50 is the femto ABS, a processor 51 of the apparatus 50 may control CSG-open/closed type change according to circumstances and may transmit such cell type change information through a Radio Frequency (RF) unit 53.

The apparatus 50 includes the processor 51, a memory 52, the RF unit 53, a display unit 54, and a user interface unit 55. Radio interface protocol layers are implemented in the processor 51. The processor 51 provides a control plane and a user plane. The function of each layer may be implemented in the processor 51. The processor 51 may include a contention resolution timer. The memory 52 is connected to the processor 51 to store an operating system, applications, and general files. If the apparatus 50 is an AMS, the display unit 54 may display various information and a well-known element such as a Liquid Crystal Display (LCD) or an Organic Light Emitting Diode (OLED) may be used for the display unit 54. The user interface unit 55 may be configured as a combination of well-known user interfaces such as a keypad and a touch screen. The RF unit 53 may be connected to the processor 51 to transmit or receive a radio signal. The RF unit 53 may be divided into a transmission module and a reception module.

Radio interface protocol layers between the UE (or AMS) and network may be classified into a first layer L1, a second layer L2, and a third layer L3 based on the lower three layers of the well-known Open System Interconnection (OSI) model in the communication system. A physical (or PHY) layer belongs to the first layer and provides an information transmission service through a physical channel. A Radio Resource Control (RRC) layer belongs to the third layer and provides control radio resources between the UE and the network. The UE and the network exchange RRC messages through the RRC layer.

The embodiments of the present invention can be implemented by hardware, firmware, software, or any combination thereof. In the case where the present invention is implemented by hardware, a method for transmitting and receiving control information according to an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case where the present invention is implemented by firmware or software, the embodiments of the present invention may be implemented in the form of modules, processes, functions, or the like which perform the features or operations described above. Software code can be stored in a memory unit so as to be executed by a processor. The memory unit may be located inside or outside the processor and can communicate data with the processor through a variety of known means.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention.

It will be apparent that claims which are not explicitly dependent on each other can be combined to provide an embodiment or new claims can be added through amendment after this application is filed.

INDUSTRIAL APPLICABILITY

The above description may be applied not only to IEEE 802.16 systems but also to various other mobile communication systems.

The invention claimed is:

1. A communication method in a mobile communication system including a macro Advanced Base Station (ABS), one or more femto ABSs, and one or more Advanced Mobile Stations (AMSs), the communication method comprising:
broadcasting, by a specific femto ABS of the one or more femto ABSs, cell type information indicating that
the specific femto ABS is being operated as a Closed Subscriber Group (CSG) femto ABS instead of an Open Subscriber Group (OSG) femto ABS, and
the CSG femto ABS is being operated as a first type CSG femto ABS from among the first type CSG femto ABS and a second type CSG femto ABS,
the first type CSG femto ABS and the second type CSG femto ABS being classified by accessibility of non-member AMSs to the specific femto ABS;
converting, by the specific femto ABS, the specific femto ABS from the first type CSG femto ABS to the second type CSG femto ABS under a specific condition; and
transmitting, by the specific femto ABS to at least one of the one or more AMSs, a signal including changed cell type information indicating that the specific femto ABS has changed from the first type CSG femto ABS to the second type CSG femto ABS,
wherein the changed cell type information is included in a preamble, and
wherein the specific condition comprises:
reception, by the specific femto ABS from a non-member AMS of the specific femto ABS that undergoes interference by the specific femto ABS, of a ranging request message that includes an indicator requesting interference mitigation, or
reception, by the specific femto ABS from the macro ABS, of type change request information or interference mitigation information for the non-member AMS of the specific femto ABS that undergoes interference by the specific femto ABS.

2. The communication method according to claim 1, wherein the first type CSG femto ABS is a CSG-closed femto ABS, and the second type CSG femto ABS is a CSG-open femto ABS.

3. The communication method according to claim 1, wherein the cell type information is included in a preamble.

4. The communication method according to claim 1, further comprising:
when resources available to the specific femto ABS are below one or more specific thresholds, broadcasting a first type femto cell bar bit indicating that only access of member AMSs to the specific femto ABS is permitted or a second type femto cell bar bit indicating that both access of the member AMSs and access of the non-member AMSs to the specific femto ABS are not permitted.

5. The communication method according to claim 2, further comprising:
upon receiving the type change request information or the interference mitigation information from the macro ABS, performing a handover procedure with the specific non-member AMS.

6. A communication method in a mobile communication system including a macro Advanced Base Station (ABS), one or more femto ABSs, and one or more Advanced Mobile Stations (AMSs), the communication method comprising:
receiving, by a specific AMS of the one or more AMSs, cell type information indicating that
a specific femto ABS of the one or more femto ABSs is being operated as a Closed Subscriber Group (CSG) femto ABS instead of an Open Subscriber Group (OSG) femto ABS, and
the CSG femto ABS is being operated as a first type CSG femto ABS from among the first type CSG femto ABS and a second type CSG femto ABS,
the first type CSG femto ABS and the second type CSG femto ABS being classified by accessibility of non-member AMSs to the specific femto ABS;
receiving, by the specific AMS from the specific femto ABS, a signal including changed cell type information indicating that the specific femto ABS has changed from the first type CSG femto ABS to the second type CSG femto ABS; and determining, by the specific AMS, whether or not to access the specific femto ABS according to the changed cell type information, wherein the changed cell type information is included in a preamble, and wherein the specific condition comprises:
reception, by the specific femto ABS from a non-member AMS of the specific femto ABS that undergoes interference by the specific femto ABS, of a ranging request message that includes an indicator requesting interference mitigation, or reception, by the specific femto ABS from the macro ABS, of type change request information or interference mitigation information for the non-member AMS of the specific femto ABS that undergoes interference by the specific femto ABS.

7. The communication method according to claim 6, wherein the first type CSG femto ABS is a CSG-closed femto ABS, and the second type CSG femto ABS is a CSG-open femto ABS.

8. The communication method according to claim 7, wherein the specific AMS is a non-member for the specific femto ABS, the communication method further comprising:
upon receiving a neighbor ABS scan command from the macro ABS indicating that the macro ABS has detected that the specific femto ABS has changed from the first type CSG femto ABS to the second type CSG femto ABS, transmitting a scan result corresponding to the neighbor ABS scan command to the macro ABS, and
upon receiving a handover command from the macro ABS, performing a procedure for handover to the specific femto ABS.

9. The communication method according to claim 6, further comprising:
when resources available to the specific femto ABS are below one or more specific thresholds, receiving a broadcast including a first type femto cell bar bit indicating that only access of member AMSs to the specific femto ABS is permitted or a second type femto cell bar bit indicating that both access of the member AMSs and access of the non-member AMSs to the specific femto ABS are not permitted.

10. A specific femto Advanced Base Station (ABS) apparatus configured to communicate in a mobile communication system including a macro ABS, one or more femto ABSs, and one or more Advanced Mobile Stations (AMSs), the specific femto ABS apparatus being one of the one or more femto ABSs and comprising:
a transmitter; and
a processor operatively connected to the transmitter and configured to
broadcast cell type information indicating that
the specific femto ABS is being operated as a Closed Subscriber Group (CSG) femto ABS instead of an Open Subscriber Group (OSG) femto ABS, and
the CSG femto ABS is being operated as a first type CSG femto ABS from among the first type CSG femto ABS and a second type CSG femto ABS,
the first type CSG femto ABS and the second type CSG femto ABS being classified by accessibility of non-member AMSs to the specific femto ABS,
convert the specific femto ABS from the first type CSG femto ABS to the second type CSG femto ABS under a specific condition, and transmit a signal including changed cell type information indicating that the specific femto ABS has changed from the first type CSG femto ABS to the second type CSG femto ABS to at least one of the one or more AMSs, wherein the changed cell type information is included in a preamble, and wherein the specific condition comprises:
reception, by the specific femto ABS from a non-member AMS of the specific femto ABS that undergoes interference by the specific femto ABS, of a ranging request message that includes an indicator requesting interference mitigation, or reception, by the specific femto ABS from the macro ABS, of type change request information or interference mitigation information for the non-member AMS of the specific femto ABS that undergoes interference by the specific femto ABS.

11. The specific femto ABS apparatus according to claim 10, wherein the first type CSG femto ABS is a CSG-closed femto ABS, and the second type CSG femto ABS is a CSG-open femto ABS.

12. The specific femto ABS apparatus according to claim 11,
upon receiving the type change request information or the interference mitigation information from the macro ABS, the processor is configured to perform a handover procedure with the specific non-member AMS.

13. The specific femto ABS apparatus according to claim 10, wherein, when resources available to the specific femto ABS are below one or more specific thresholds, the processor is configured to broadcast a first type femto cell bar bit indicating that only access of member AMSs to the specific femto ABS is permitted or a second type femto cell bar bit indicating that both access of the member AMSs and access of the non-member AMSs to the specific femto ABS are not permitted.

14. A specific AMS apparatus configured to communicate in a mobile communication system including a macro Advanced Base Station (ABS), one or more femto ABSs, and one or more Advanced Mobile Stations (AMSs), the specific AMS apparatus being one of the one or more AMSs and comprising:
a receiver; and
a processor operatively connected to the receiver and configured to
receive cell type information indicating that
a specific femto ABS of the one or more femto ABSs is being operated as a Closed Subscriber Group (CSG) femto ABS instead of an Open Subscriber Group (OSG) femto ABS, and
the CSG femto ABS is being operated as a first type CSG femto ABS from among the first type CSG femto ABS and a second type CSG femto ABS,
the first type CSG femto ABS and the second type CSG femto ABS being classified by accessibility of non-member AMSs to the specific femto ABS,
receive a signal including changed cell type information indicating that the specific femto ABS has changed from the first type CSG femto ABS to the second type CSG femto ABS, and
determine whether or not to access the specific femto ABS according to the changed cell type information,
wherein the changed cell type information is included in a preamble, and wherein the specific condition comprises:
reception, by the specific femto ABS from a non-member AMS of the specific femto ABS that undergoes interference by the specific femto ABS, of a ranging request message that includes an indicator requesting interference mitigation, or
reception, by the specific femto ABS from the macro ABS, of type change request information or interference mitigation information for the non-member AMS of the specific femto ABS that undergoes interference by the specific femto ABS.

15. The specific AMS apparatus according to claim 14, wherein the first type CSG femto ABS is a CSG-closed femto ABS, and the second type CSG femto ABS is a CSG-open femto ABS.

16. The specific AMS apparatus according to claim 15, wherein the specific AMS is a non-member for the specific femto ABS, the AMS apparatus further comprising:
a transmitter operatively connected to the processor,
wherein, upon receiving a neighbor ABS scan command from the macro ABS indicating that the macro ABS has detected that the specific femto ABS has changed from the first type CSG femto ABS to the second type CSG femto ABS, the processor is configured to transmit a scan result corresponding to the neighbor ABS scan command to the macro ABS, and
wherein, upon receiving a handover command from the macro ABS, the processor is configured to perform a procedure for handover to the specific femto ABS.

17. The specific femto AMS apparatus according to claim 14, wherein, when resources available to the specific femto ABS are below one or more specific thresholds, the processor is configured to receive a broadcast that includes a first type femto cell bar bit indicating that only access of member AMSs to the specific femto ABS is permitted or a second type femto cell bar bit indicating that both access of the member AMSs and access of the non-member AMSs to the specific femto ABS are not permitted.

* * * * *